US009646764B2

(12) United States Patent
Shirai et al.

(10) Patent No.: US 9,646,764 B2
(45) Date of Patent: May 9, 2017

(54) RECTANGULAR WIRE EDGEWISE-BENDING PROCESSING DEVICE AND RECTANGULAR WIRE EDGEWISE-BENDING PROCESSING METHOD

(71) Applicant: MITSUBISHI ELECTRIC CORPORATION, Chiyoda-ku, Tokyo (JP)

(72) Inventors: Yutaro Shirai, Tokyo (JP); Hiroyuki Akita, Tokyo (JP); Atsushi Sakaue, Tokyo (JP); Shinichiro Yoshida, Tokyo (JP); Masaya Inoue, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/646,876

(22) PCT Filed: Jan. 21, 2014

(86) PCT No.: PCT/JP2014/051061
§ 371 (c)(1),
(2) Date: May 22, 2015

(87) PCT Pub. No.: WO2014/115703
PCT Pub. Date: Jul. 31, 2014

(65) Prior Publication Data
US 2015/0302988 A1    Oct. 22, 2015

(30) Foreign Application Priority Data

Jan. 22, 2013  (JP) ................................. 2013-008931

(51) Int. Cl.
*H01F 41/06*    (2016.01)
*B21F 3/04*    (2006.01)
(Continued)

(52) U.S. Cl.
CPC .............. *H01F 41/065* (2013.01); *B21F 1/00* (2013.01); *B21F 3/04* (2013.01); *H01F 41/071* (2016.01);
(Continued)

(58) Field of Classification Search
CPC ...... H01F 41/06; H01F 41/061; H01F 41/071; H01F 41/074; H01F 41/082; H01F 41/09; H01F 41/098; B21F 3/04
See application file for complete search history.

(56) References Cited

U.S. PATENT DOCUMENTS

2010/0000624 A1 * 1/2010 Matsushita ........... H01F 41/077
                                                    140/124
2010/0026133 A1    2/2010 Fubuki et al.

FOREIGN PATENT DOCUMENTS

JP   2006-288025 A   10/2006
JP   2008-178199 A   7/2008

OTHER PUBLICATIONS

International Search Report (PCT/ISA/210) mailed on May 13, 2014, by the Japanese Patent Office as the International Searching Authority for International Application No. PCT/JP2014/051061.
(Continued)

*Primary Examiner* — Debra Sullivan
(74) *Attorney, Agent, or Firm* — Buchanan Ingersoll & Rooney PC

(57) ABSTRACT

Provided is a rectangular wire edgewise-bending processing device for performing an edgewise-bending process for a rectangular wire to form a coil, the rectangular wire edgewise-bending processing device including a fixing unit for fixing the rectangular wire, a pressing tool for pressing a surface formed by a long side of a rectangular cross section of the rectangular wire, and a bending tool for bending the rectangular wire into a predetermined coil shape, wherein the edgewise-bending process is performed while the sur-
(Continued)

face formed by the long side of the rectangular cross section of the rectangular wire is pressed.

9 Claims, 12 Drawing Sheets

(51) Int. Cl.
  *B21F 1/00* (2006.01)
  *H02K 15/04* (2006.01)
  *H01F 41/082* (2016.01)
  *H01F 41/071* (2016.01)
  *H01F 17/04* (2006.01)
(52) U.S. Cl.
  CPC ......... *H01F 41/082* (2016.01); *H02K 15/045* (2013.01); *H01F 2017/046* (2013.01)

(56) References Cited

OTHER PUBLICATIONS

Office Action issued Oct. 27, 2016 by the Chinese Patent Office in corresponding Chinese Patent Application No. 201480004852.6, and a partial English translation thereof (12 pages).

* cited by examiner

100

(a)    (b)

Fig. 9
(a)
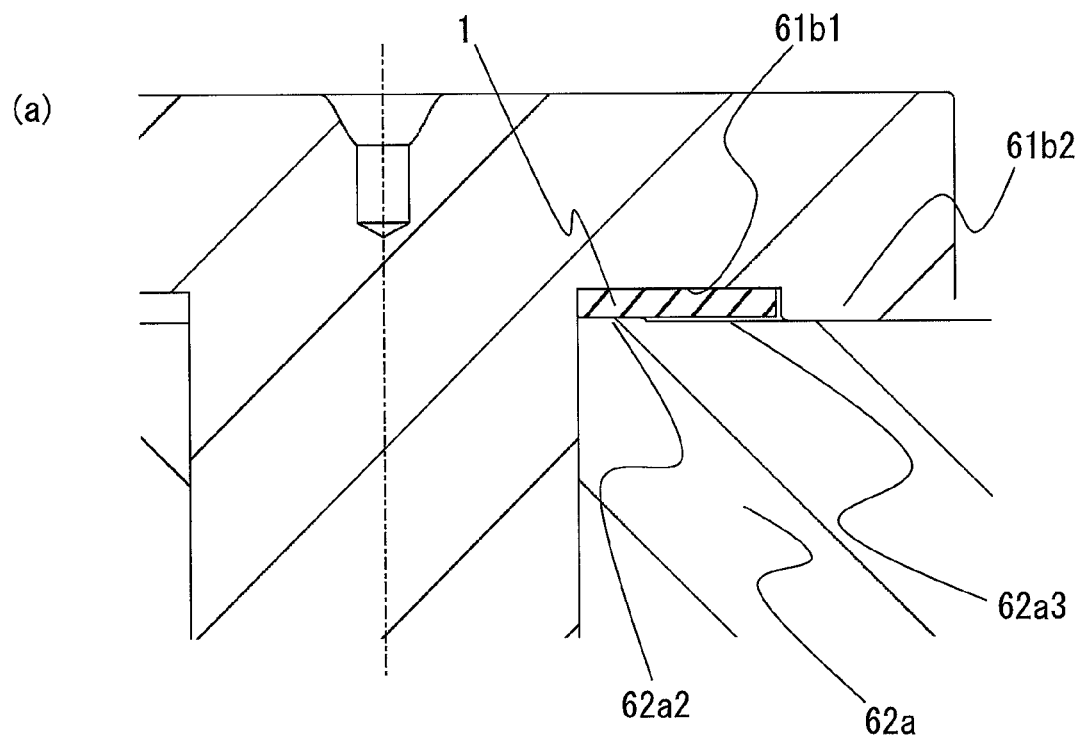
(b)
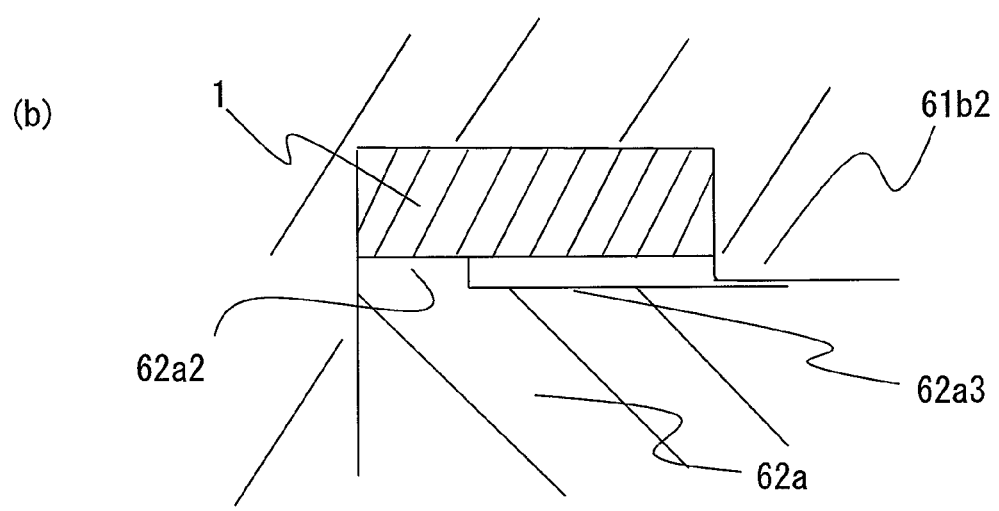

Fig. 10
(a)
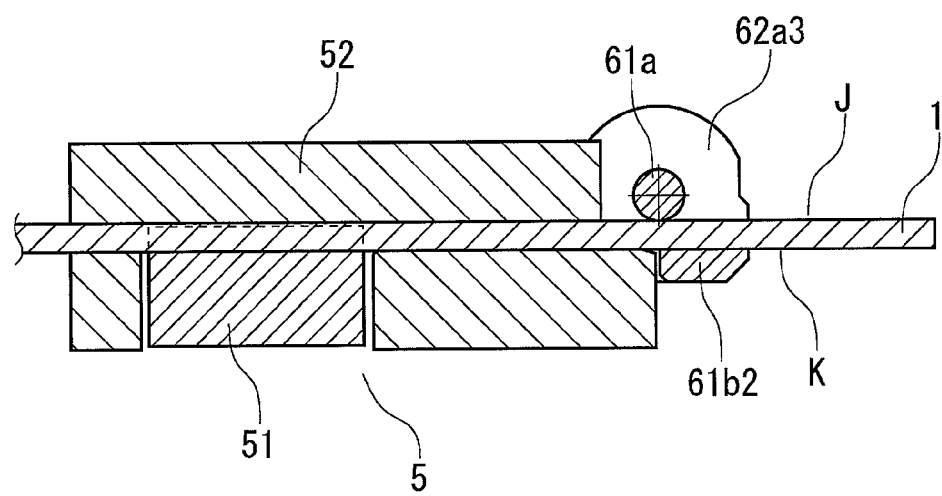
(b)
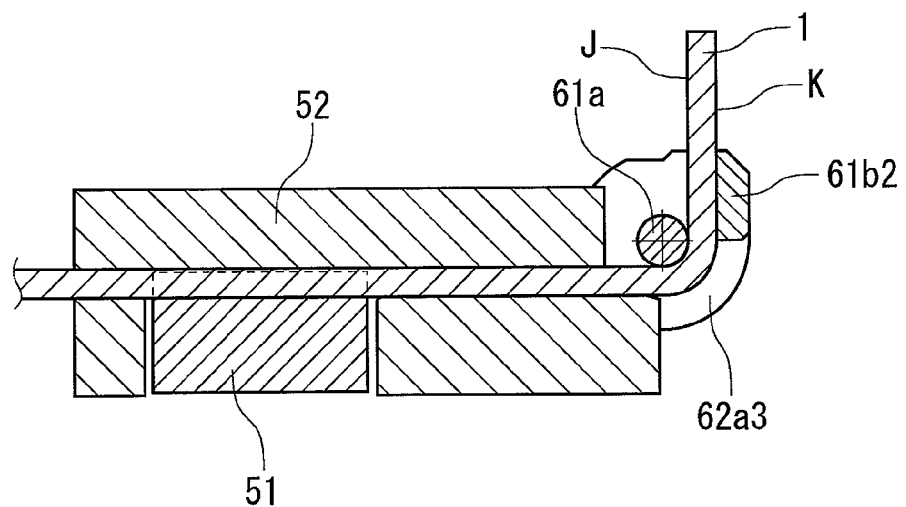

Fig. 11
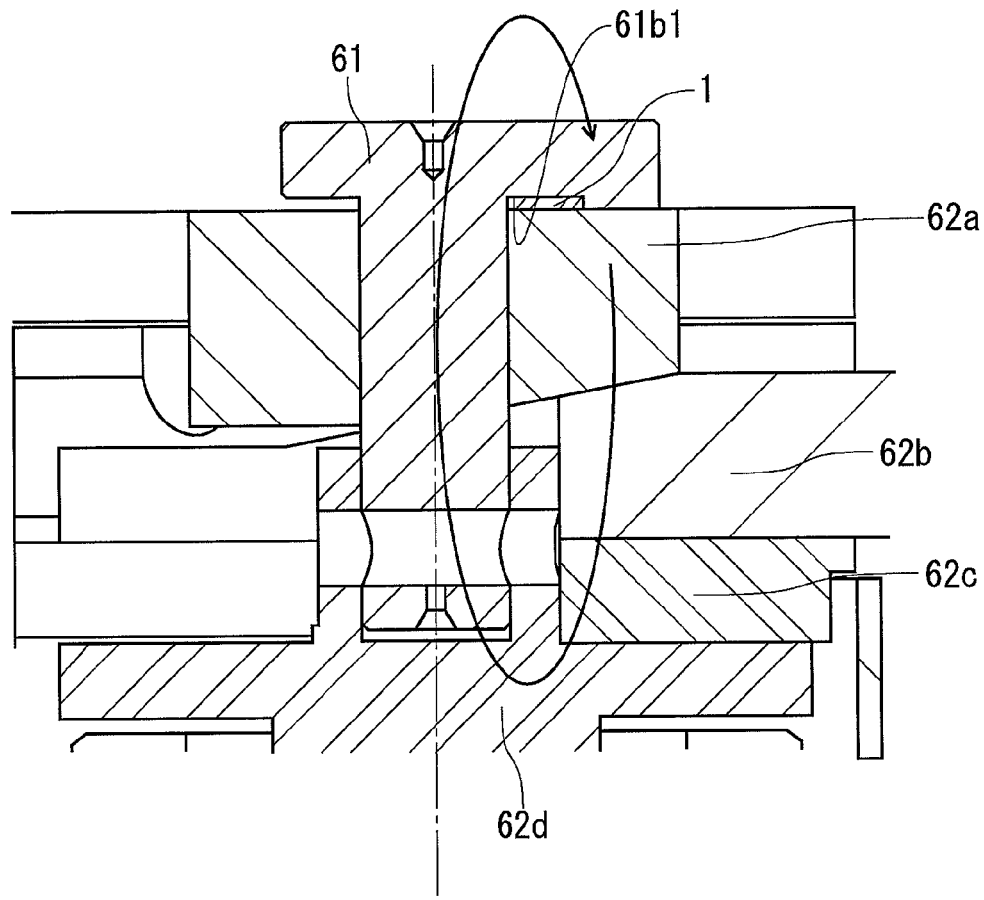
Fig. 12
(a)
(b)
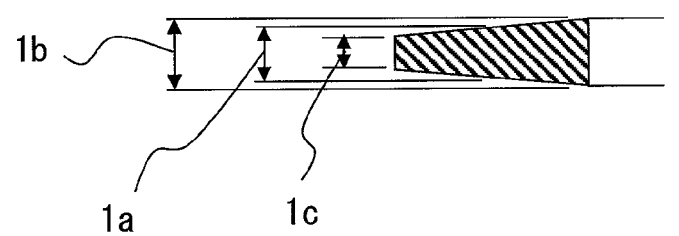

Fig. 14
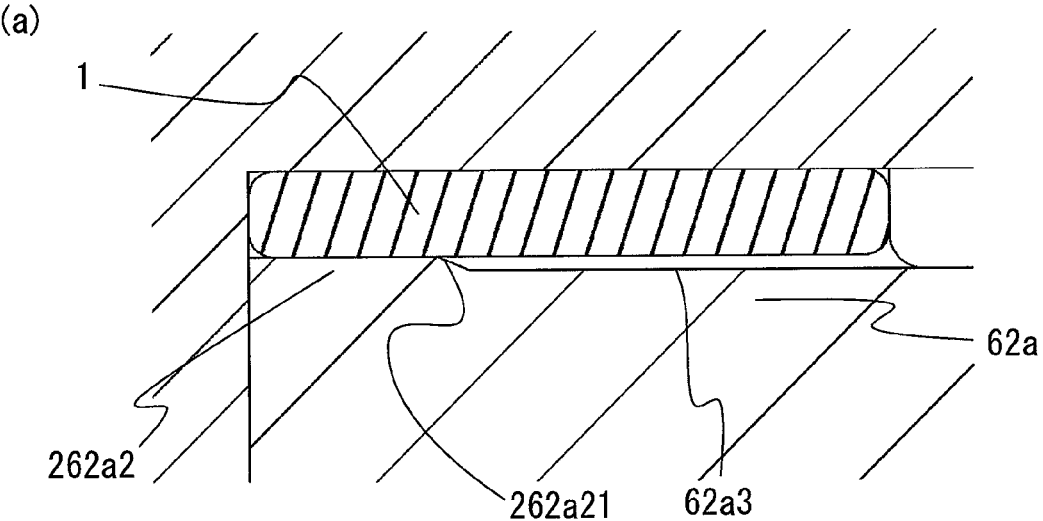
(a)
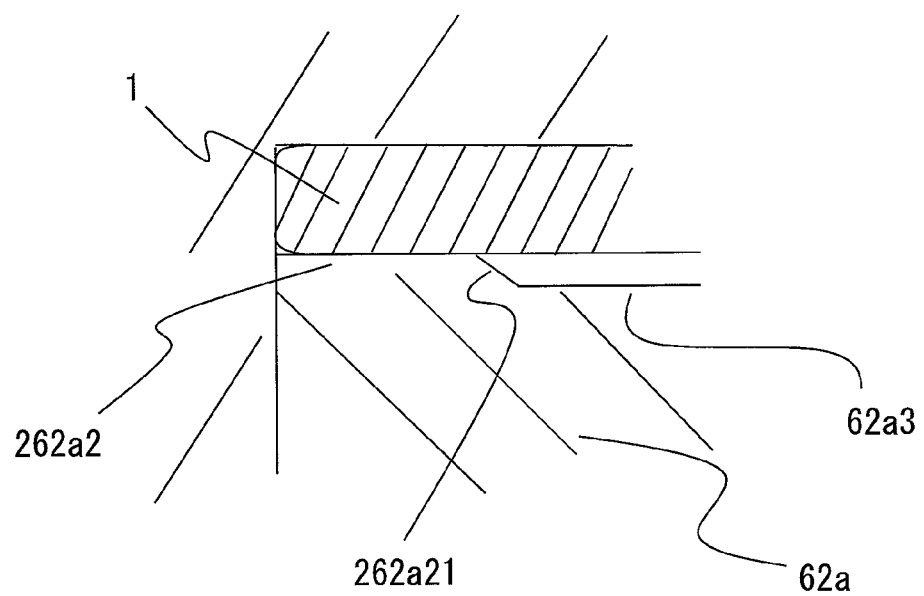
(b)

Fig. 15
(a)
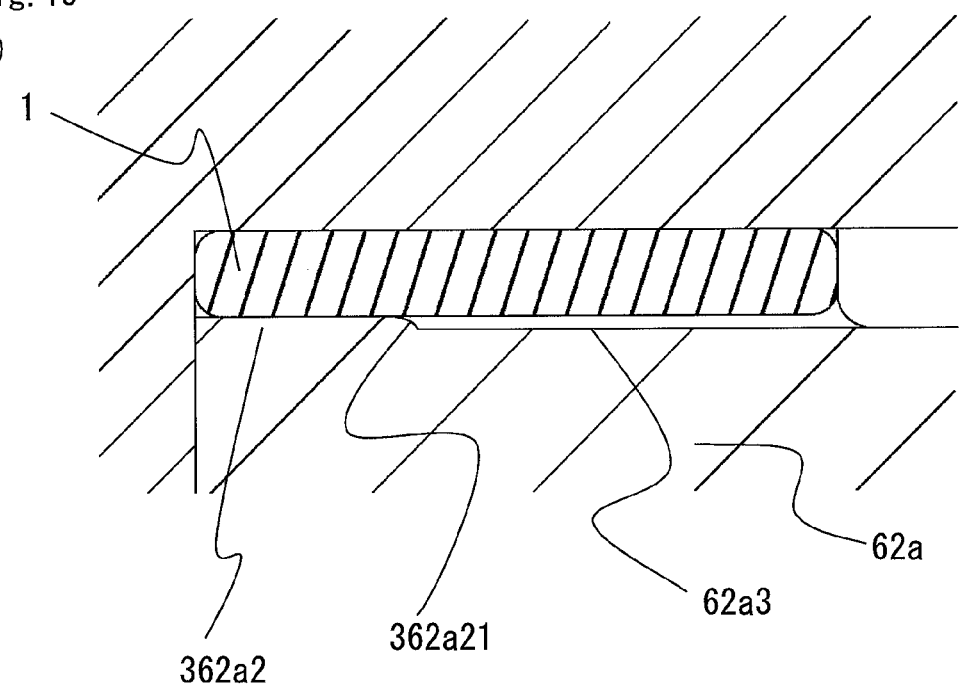
(b)
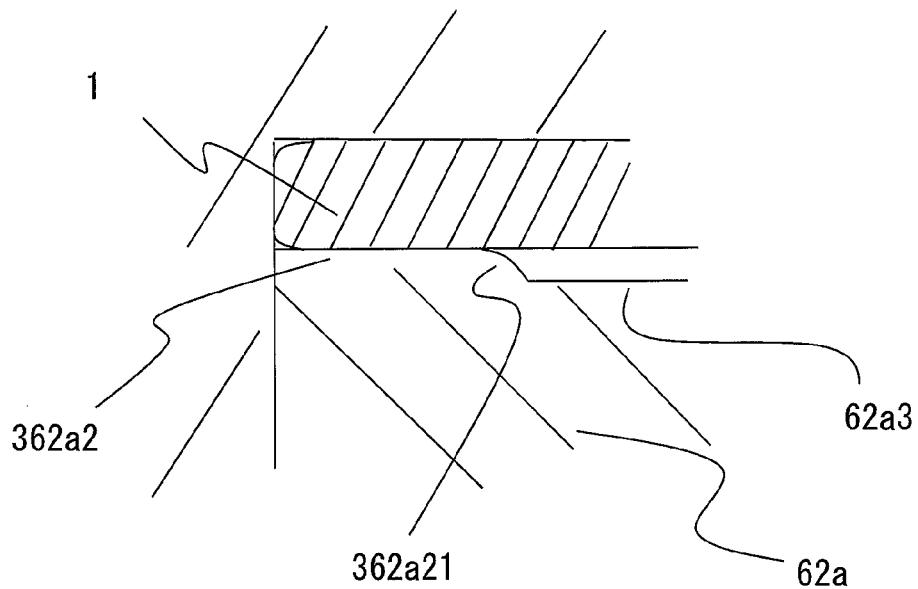

RECTANGULAR WIRE EDGEWISE-BENDING PROCESSING DEVICE AND RECTANGULAR WIRE EDGEWISE-BENDING PROCESSING METHOD

TECHNICAL FIELD

The present invention relates to a rectangular wire edgewise-bending processing device and a rectangular wire edgewise-bending processing method used for a coil of a rotating electric machine.

BACKGROUND ART

When a rectangular wire used for a coil of a rotating electric machine is subjected to an edgewise-bending process (hereinafter, simply referred to as a bending process), the sheet thickness (the length of a short side of a rectangular cross section perpendicular to a longitudinal direction of the rectangular wire, the same applies hereinafter) of a processed part becomes greater than that of an element wire. At the part where the sheet thickness increases, layers of a rectangular wire stacked as a coil interfere with each other, thereby causing reduction in a space factor of the coil. Considering this, as a method for suppressing increase in the sheet thickness of a rectangular wire, a technique is proposed in which a surface formed by a long side of a rectangular cross section of the rectangular wire is pressed by a deformation mechanism to deform in advance the rectangular wire so that the sheet thickness thereof is decreased, and then a bending process is performed (for example, Patent Document 1).

CITATION LIST

Patent Document

Patent Document 1: Japanese Laid-Open Patent Publication No. 2008-178199

SUMMARY OF THE INVENTION

Problems to be Solved by the Invention

In Patent Document 1, considering an increase amount of a sheet thickness on an inner circumferential surface side of the bent part, this part of an element wire of the rectangular wire is deformed in advance by the deformation mechanism so that the thickness thereof is decreased by a predicted increase amount in the process. As a result, after the bending process, the sheet thickness of the bent part on the inner circumferential surface side of a coil to be formed becomes equal to the thickness of the element wire, whereby it becomes possible to manufacture a coil while keeping constant the sheet thickness on the inner circumferential side of the coil to be formed.

In such a coil manufacturing technique, it is required that, in the longitudinal direction of the rectangular wire, a process position at which the sheet thickness is decreased by the deformation mechanism coincides with the bending process position.

At the process position at which the sheet thickness is decreased by the deformation mechanism, on the other hand, the width in a short-side direction of the rectangular wire increases. Therefore, the width of the rectangular wire (the length of a long side of the rectangular cross section perpendicular to the longitudinal direction of the rectangular wire, the same applies hereinafter) does not become constant along the longitudinal direction. Therefore, in a bending process after the sheet thickness of the rectangular wire is decreased by the deformation mechanism, it is difficult to perform positioning for the bending process position in the longitudinal direction of the rectangular wire, so there is a problem that shape accuracy of the coil may be deteriorated.

In addition, the width of the rectangular wire increases due to the sheet thickness decreasing process for the rectangular wire by the deformation mechanism, and an outer circumferential surface side of the coil is greatly elongated in the longitudinal direction due to the bending process thereafter. As a result, an insulating coat of the rectangular wire is elongated in both directions, to be thinned, thereby causing a problem that performance of the insulating coat is deteriorated.

The present invention has been made to solve the above problems, and an object of the present invention is to provide a rectangular wire edgewise-bending processing device and a rectangular wire edgewise-bending processing method that prevent the sheet thickness of an edgewise-bending-processed part of a rectangular wire from expanding as compared to an element wire.

Solution to the Problems

A rectangular wire edgewise-bending processing device according to the present invention is a rectangular wire edgewise-bending processing device for performing an edgewise-bending process for a rectangular wire to form a coil, wherein one surface formed by a long side of a rectangular cross section of the rectangular wire is a first surface, a surface opposite to the first surface is a second surface, a surface, formed by a short side of the rectangular cross section of the rectangular wire, which corresponds to an inner circumferential surface side of the coil to be formed, is a third surface, and a surface opposite to the third surface, which corresponds to an outer circumferential surface side of the coil to be formed, is a fourth surface, the rectangular wire edgewise-bending processing device including: a fixing member for fixing a straight portion of the rectangular wire; a bending tool including: a shaft being rotatable and cylindrical and having a rotational axis extending in a short-side direction of the rectangular cross section of the rectangular wire, the shaft allowing the third surface to contact with an outer circumferential surface of the shaft in such a positional relationship that the rotational axis of the shaft is perpendicular to a longitudinal direction of the rectangular wire; and a flange attached to the shaft, the flange having a flange board surface for pressing the first surface, and having a bending guide protruding from the flange board surface in the same direction as the shaft, so as to contact with the fourth surface; and a pressing tool for pressing the second surface toward the flange, with the rectangular wire held between the pressing tool and the flange board surface of the flange. The pressing tool includes: a pressing member having a press surface for pressing the rectangular wire; a rotation base fixing an end portion, of the bending tool, at a side where the flange does not exist, the rotation base rotating integrally with the bending tool; a press guide placed on the rotation base; and a wedge-shaped member movable frontward and backward perpendicularly to the shaft while being guided by the press guide, between the pressing member and the press guide, thereby causing the pressing member to move upward and downward along a slope of the wedge-shaped member.

A rectangular wire edgewise-bending processing method according to the present invention is a rectangular wire edgewise-bending processing method for performing an edgewise-bending process for a rectangular wire, wherein one surface formed by a long side of a rectangular cross section of the rectangular wire is a first surface, a surface opposite to the first surface is a second surface, a surface, formed by a short side of the rectangular cross section of the rectangular wire, which corresponds to an inner circumferential surface side of a coil to be formed, is a third surface, and a surface opposite to the third surface, which corresponds to an outer circumferential surface side of the coil to be formed, is a fourth surface, wherein the third surface contacts with an outer circumferential surface of a shaft that is rotatable and cylindrical and has a rotational axis extending in a short-side direction of the rectangular cross section of the rectangular wire. The rectangular wire edgewise-bending processing method includes: a pressing step of plastically deforming the rectangular wire to decrease a sheet thickness which is a length of the short side of the rectangular cross section; and a bending step of bending the rectangular wire so that the third surface is bent along the outer circumferential surface of the shaft, while the rectangular wire is pressed in the pressing step.

Effect of the Invention

The rectangular wire edgewise-bending processing device according to the present invention includes: a fixing member for fixing a straight portion of the rectangular wire; a bending tool including: a shaft being rotatable and cylindrical and having a rotational axis extending in a short-side direction of the rectangular cross section of the rectangular wire, the shaft allowing the third surface to contact with an outer circumferential surface of the shaft in such a positional relationship that the rotational axis of the shaft is perpendicular to a longitudinal direction of the rectangular wire; and a flange attached to the shaft, the flange having a flange board surface for pressing the first surface, and having a bending guide protruding from the flange board surface in the same direction as the shaft, so as to contact with the fourth surface; and a pressing tool for pressing the second surface toward the flange, with the rectangular wire held between the pressing tool and the flange board surface of the flange. The pressing tool includes: a pressing member having a press surface for pressing the rectangular wire; a rotation base fixing an end portion, of the bending tool, at a side where the flange does not exist, the rotation base rotating integrally with the bending tool; a press guide placed on the rotation base; and a wedge-shaped member movable frontward and backward perpendicularly to the shaft while being guided by the press guide, between the pressing member and the press guide, thereby causing the pressing member to move upward and downward along a slope of the wedge-shaped member.

Therefore, the edgewise-bending process is performed while a surface formed by the long side of the rectangular cross section of the rectangular wire is pressed, whereby increase in the sheet thickness of the bent part on the inner circumferential surface side of the coil to be formed can be suppressed. Since it is not necessary to decrease in advance the sheet thickness of a part to be bent, the width of the rectangular wire becomes constant along the longitudinal direction of the rectangular wire. Therefore, in the edgewise-bending process, positioning in the short-side direction of the rectangular wire can be accurately performed, and the coil shape accuracy can be improved.

Further, since extension in the longitudinal direction due to edgewise bending, of the insulating coat of the rectangular wire on the outer circumferential surface side of the coil to be formed is reduced, deterioration in insulation performance can be suppressed.

In the rectangular wire edgewise-bending processing method according to the present invention, the third surface contacts with an outer circumferential surface of a shaft that is rotatable and cylindrical and has a rotational axis extending in a short-side direction of the rectangular cross section of the rectangular wire. The rectangular wire edgewise-bending processing method includes: a pressing step of plastically deforming the rectangular wire to decrease a sheet thickness which is a length of the short side of the rectangular cross section; and a bending step of bending the rectangular wire so that the third surface is bent along the outer circumferential surface of the shaft, while the rectangular wire is pressed in the pressing step.

Therefore, the edgewise-bending process is performed while a surface formed by the long side of the rectangular cross section of the rectangular wire is pressed, whereby increase in the sheet thickness of the bent part on the inner circumferential surface side of the coil to be formed can be suppressed. Since it is not necessary to decrease in advance the sheet thickness of a part to be bent, the width of the rectangular wire becomes constant along the longitudinal direction of the rectangular wire. Therefore, in the edgewise-bending process, positioning in the short-side direction of the rectangular wire can be accurately performed, and the coil shape accuracy can be improved.

Further, since extension in the longitudinal direction due to edgewise bending, of the insulating coat of the rectangular wire on the outer circumferential surface side of the coil to be formed is reduced, deterioration in insulation performance can be suppressed.

BRIEF DESCRIPTION OF THE DRAWINGS

FIG. 9 is an enlarged view of a major part in FIG. 8, according to embodiment 1.

FIG. 10 is a schematic sectional view showing a bending process for the rectangular wire, according to embodiment 1.

FIG. 11 is a sectional view showing how load is transferred by a pressing tool, according to embodiment 1.

FIG. 12 is sectional views of the rectangular wire before a binding process and the rectangular wire after a binding process, in the case where a general bending process is performed, according to embodiment 1.

FIG. 14 is an enlarged view of a part where a rectangular wire is pressed by a processing unit, according to embodiment 2.

FIG. 15 is an enlarged view of a part where a rectangular wire is pressed by a processing unit, according to embodiment 3.

DESCRIPTION OF EMBODIMENTS

Embodiment 1

Hereinafter, a rectangular wire edgewise-bending processing device according to embodiment 1 of the present invention will be described based on the drawings.

Figure 1:
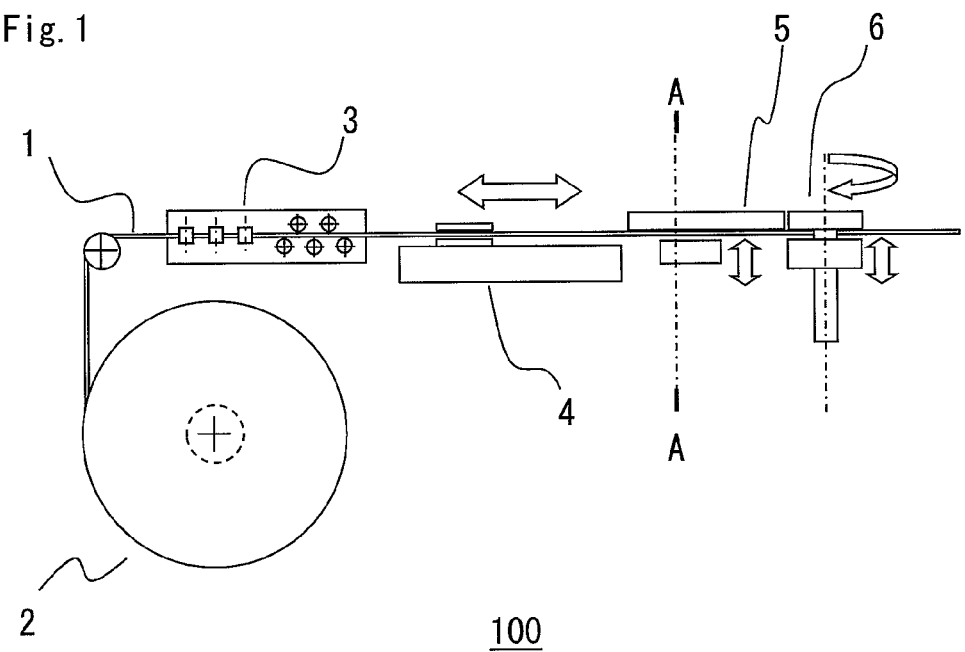
FIG. 1 is a diagram showing the configuration of a rectangular wire edgewise-bending processing device according to embodiment 1.

FIG. 1 is a diagram showing the configuration of a rectangular wire edgewise-bending processing device 100 (hereinafter, referred to as a processing device 100).

Figure 2:
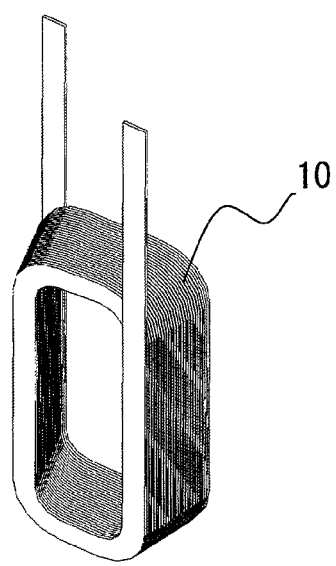
FIG. 2 is a perspective view of a coil obtained through a bending process by the rectangular wire edgewise-bending processing device, according to embodiment 1.

FIG. 2 is a perspective view of a coil 10 manufactured through a bending process.

Figure 3:
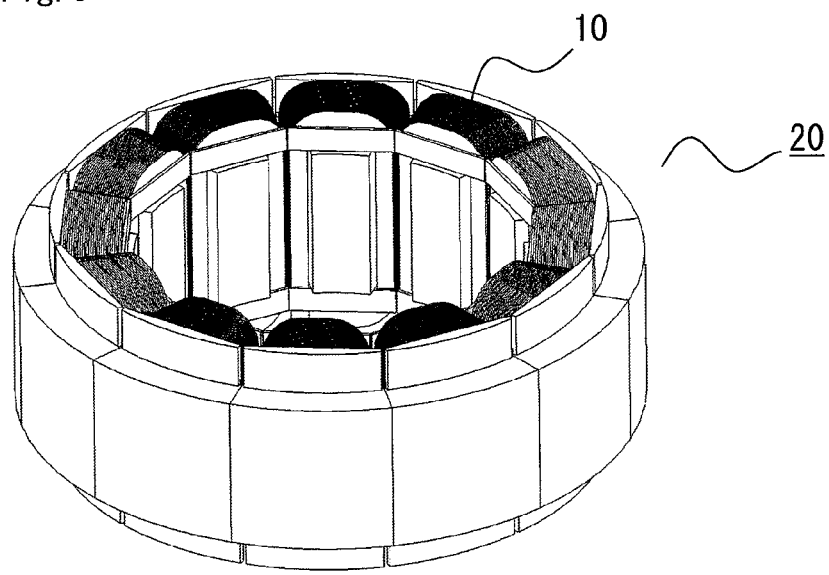
FIG. 3 is a perspective view of a stator of a rotating electric machine to which the coil is applied, according to embodiment 1.

FIG. 3 is a perspective view of a stator 20 of a rotating electric machine to which the coil 10 is applied.

The processing device 100 includes five elements of an uncoiler 2, a strainer 3, a feed unit 4, a fixing unit 5, and a rectangular wire processing unit 6 (hereinafter, referred to as a processing unit 6). The uncoiler 2 feeds a rectangular wire 1 wound on a bobbin and having an insulating coat, to the strainer 3. The strainer 3 strains the rectangular wire 1 fed by the uncoiler 2 so as to smooth a surface formed by a long side of a rectangular cross section of the rectangular wire 1 and a surface formed by a short side thereof. The feed unit 4 feeds, by a certain amount, the rectangular wire 1 smoothed by the strainer 3, to the fixing unit 5. The fixing unit 5 holds the rectangular wire 1 fed by the feed unit 4. The processing unit 6 performs a bending process for the rectangular wire 1.

Figure 4:
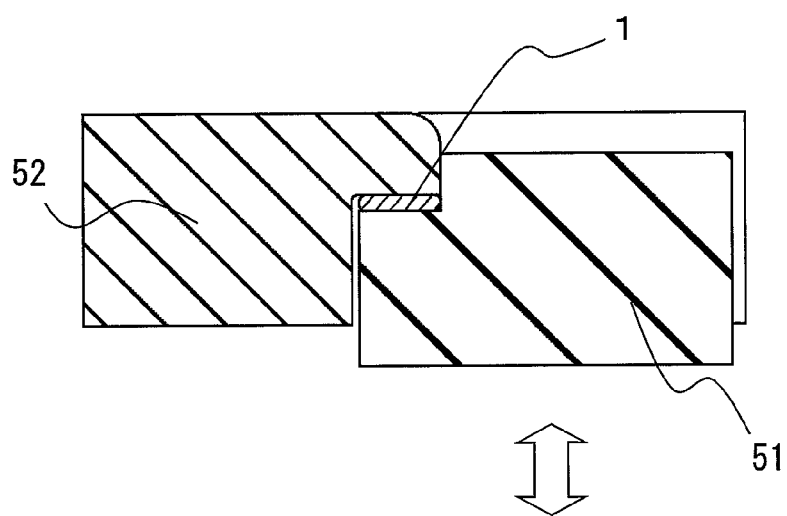
FIG. 4 is a sectional view of a fixing unit according to embodiment 1.

FIG. 4 is a sectional view of the fixing unit 5 along A-A line in FIG. 1.

The fixing unit 5 (in claims, referred to as a fixing member) includes a fixing guide 52 and an elevating board 51. The fixing guide 52 has an L-shaped cross section at a part for fixing the rectangular wire 1. The elevating board 51 which also has an L-shaped cross section elevates from below, whereby the rectangular wire 1 is surrounded and fixed.

Figure 5:
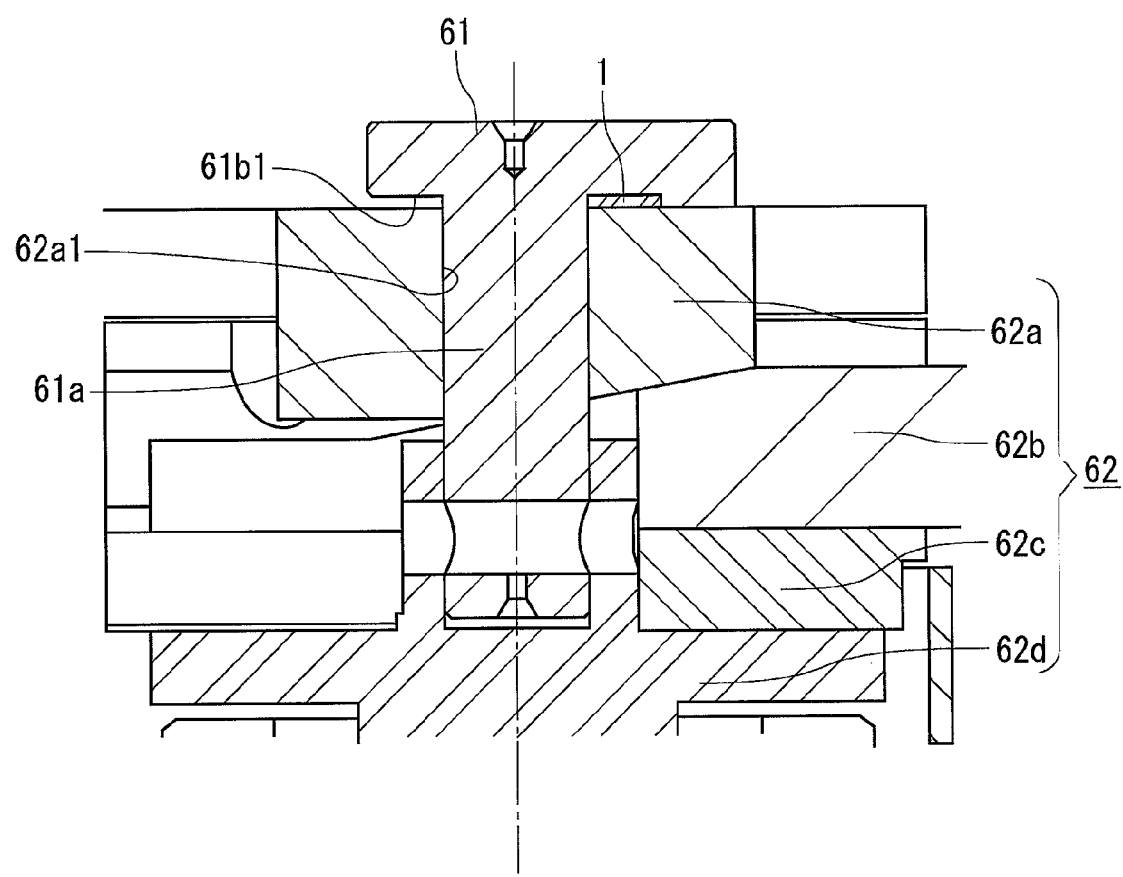
FIG. 5 is a sectional view of a processing unit according to embodiment 1.

FIG. 5 is a sectional view of the processing unit 6.

The processing unit 6 includes a bending tool 61 and a pressing tool 62. The bending tool 61 is a member for bending the rectangular wire 1 into a predetermined coil shape. The pressing tool 62 is a member for pressing the rectangular wire 1 upward from below in FIG. 5 in a process by the bending tool 61.

Figure 6:
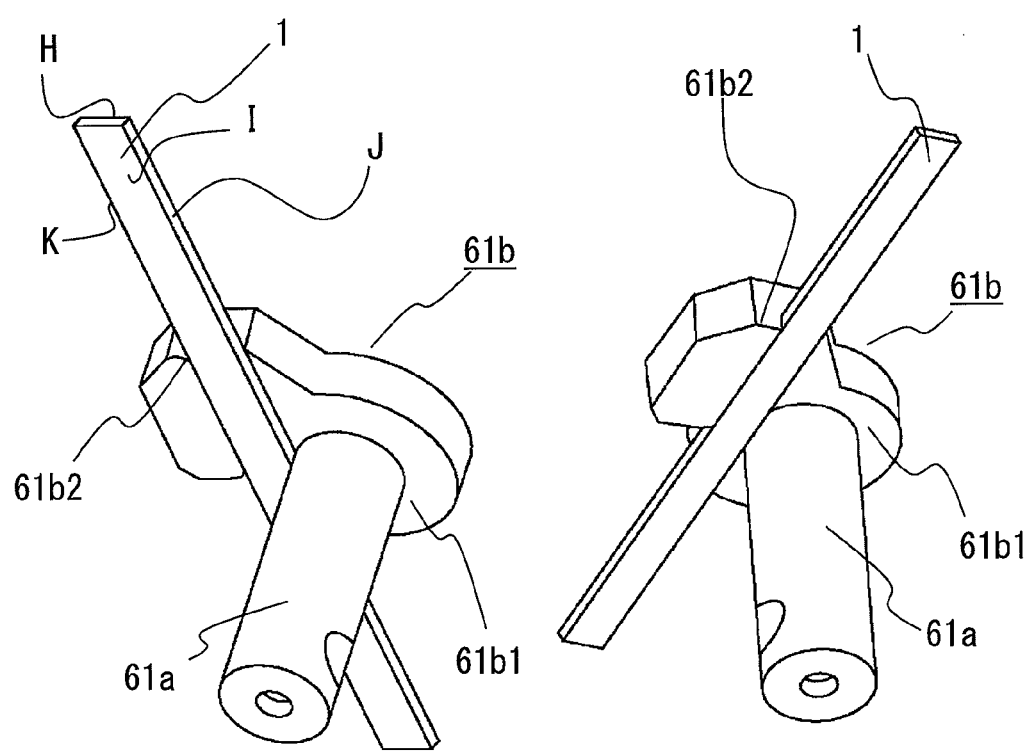
FIG. 6 is a perspective view of a bending tool according to embodiment 1.

FIG. 6(a) and FIG. 6(b) are perspective views of the bending tool 61.

FIG. 6(a) and FIG. 6(b) are views from different perspectives.

The bending tool 61 has a cylindrical shaft 61a extending in a short-side direction of the rectangular cross section of the rectangular wire 1, and a flange 61b attached to an end of the shaft 61a.

Hereinafter, of four outer circumferential surfaces of the rectangular wire 1, a surface to contact with a flange board surface 61b1 of the flange 61b is defined as a first surface H, a surface opposite to the first surface H is defined as a second surface I, a surface to contact with the shaft 61a is defined as a third surface J, and a surface opposite to the third surface J is defined as a fourth surface K.

The shaft 61a and the third surface J of the rectangular wire 1 contact with each other in such a positional relationship that a rotational axis of the shaft 61a is perpendicular to the longitudinal direction of the rectangular wire 1. The flange 61b has the flange board surface 61b1 to contact with the first surface H of the rectangular wire 1, and a bending guide 61b2 which protrudes from the flange board surface 61b1 in the same direction as the shaft 61a and contacts, surface-to-surface, with the fourth surface K of the rectangular wire 1.

The pressing tool 62 shown in FIG. 5 is composed of a pressing member 62a, a wedge-shaped member 62b, a press guide 62c, and a rotation base 62d. The press guide 62c is placed on the rotation base 62d. The wedge-shaped member 62b is movable forward and backward perpendicularly to the shaft 61a, between the pressing member 62a and the press guide 62c.

Figure 7:
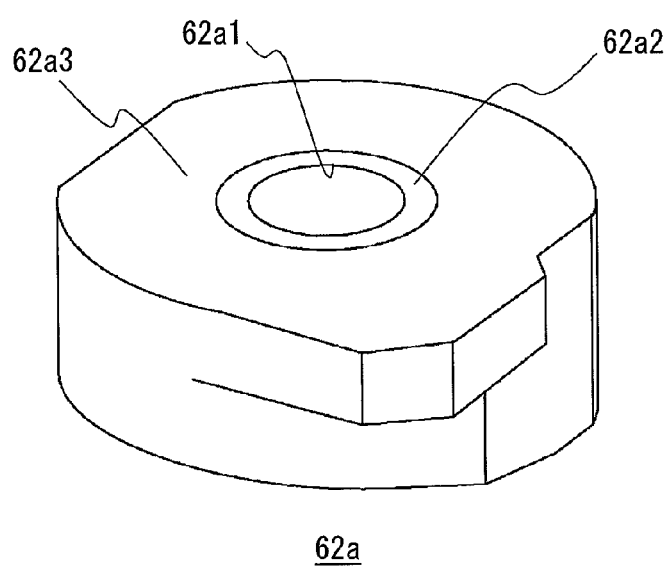
FIG. 7 is a perspective view of a pressing member according to embodiment 1.

FIG. 7 is a perspective view of the pressing member 62a.

The pressing member 62a has a hole 62a1 at the center thereof into which the shaft 61a is inserted, and a press surface 62a2 formed in a predetermined area around the hole 62a1 and protruding in a ring shape. The press surface 62a2 presses the rectangular wire 1, with the rectangular wire 1 held between the press surface 62a2 and the flange board surface 61b1. The pressing member 62a has an out-of-surface deformation regulating surface 62a3 with a step from the press surface 62a2, for regulating, via a predetermined gap, out-of-surface deformation caused at an outer circumferential surface side of a coil in a bending process for the rectangular wire 1.

A relationship between the bending tool 61 and the pressing tool 62 will be described based on FIG. 5.

The shaft 61a of the bending tool 61 is inserted into the hole 62a1 of the pressing member 62a of the pressing tool 62, and fixed to the rotation base 62d. The flange board surface 61b1 of the bending tool 61 is located to be opposed to the pressing member 62a. A rotating device (not shown) is attached to the rotation base 62d. When the rotating device rotates, the bending tool 61 fixed to the rotation base is rotated integrally with the rotation base 62d.

As described above, on the rotation base 62d, the press guide 62c is placed, and further, the wedge-shaped member 62b to be guided by the press guide 62c, and the pressing member 62a to be moved upward and downward along a slope of an end portion of the wedge-shaped member 62b are overlaid. All members of the pressing tool 62 are rotated integrally with the bending tool 61 along with rotation of the rotating device.

Owing to such a configuration, during a bending process, a relative positional relationship between the bending tool 61 and the pressing tool 62 is not changed by rotation of the rotating device.

Next, operation of the processing device 100 of embodiment 1 configured as described above will be described.

First, each step of a bending process for the rectangular wire 1 will be described.

In a rectangular wire feeding step, the feed unit 4 feeds the rectangular wire 1 by a certain amount to between a cylindrical surface of the shaft 61a and the bending guide 61b2 opposed to the shaft 61a.

Next, in a fixing step, the rectangular wire 1 is fixed by the fixing unit 5 so as to be surrounded.

Next, in a pressing step, the rectangular wire 1 is held, being pressed, between the bending tool 61 and the pressing tool 62 of the processing unit 6.

Pressing operation of the pressing tool 62 will be described based on FIG. 5. The wedge-shaped member 62b is inserted under the pressing member 62a while being guided by the press guide 62c, thereby pressing the rectangular wire 1 upward from below via the pressing member 62a.

A pressed area of the rectangular wire 1 will be described.

Figure 8:
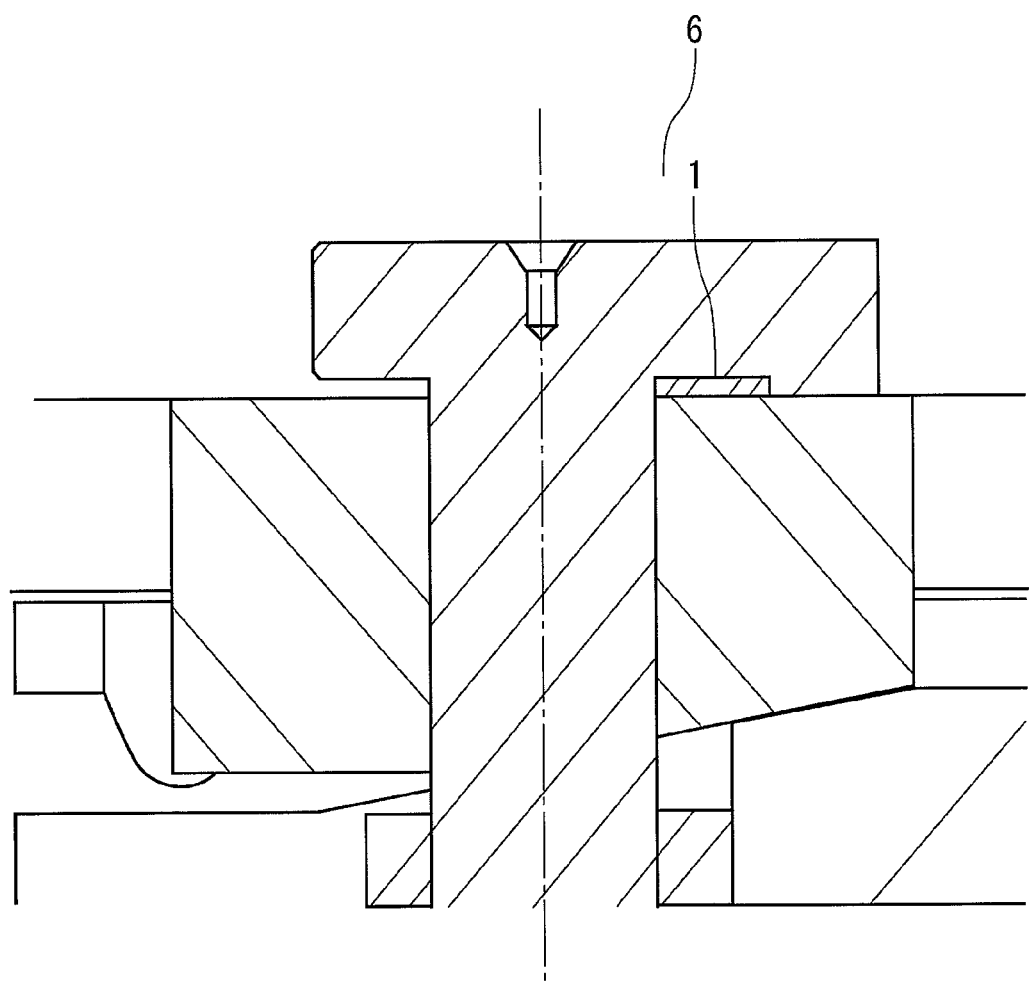
FIG. 8 is a sectional view showing a state in which a rectangular wire is pressed by the processing unit, according to embodiment 1.

FIG. 8 is a sectional view showing the rectangular wire 1 being pressed by the processing unit 6.

FIG. 9(a) is an enlarged view of a pressed part of the rectangular wire 1 in FIG. 8.

FIG. 9(b) is an enlarged view of a periphery of the rectangular wire 1 in FIG. 9(a).

An area, of the pressing tool 62, that is to press the rectangular wire 1 is the press surface 62a2 of the pressing tool 62. The out-of-surface deformation regulating surface 62a3 of the pressing tool 62 is stepped down from the press surface 62a2 so that a gap is formed between the rectangular wire 1 and the out-of-surface deformation regulating surface 62a3. Therefore, the out-of-surface deformation regulating surface 62a3 does not press the rectangular wire 1. The reason for limiting the pressing area of the pressing tool 62 to the press surface 62a2 is that, if the entire surface of the rectangular wire 1 is pressed, since an extension rate of the rectangular wire 1 is greatly different between a part corresponding to an outer circumferential side of a coil and a part corresponding to an inner circumferential side of the coil, it is highly likely that the rectangular wire 1 is damaged in a bending process. Therefore, an area pressed by the pressing tool 62 is set to be a minimum necessary range.

The press surface 62a2 applies, to the rectangular wire 1, a press force that allows the rectangular wire 1 to move frictionally to some extent. Although not shown, the press force can be adjusted according to a rectangular wire to be used. The reason is that, if the rectangular wire 1 is completely pressed and fixed by the press surface 62a2, the rectangular wire 1 moves frictionally against the press surface 62a2 at the same time as the rectangular wire 1 is bent, whereby the rectangular wire 1 may be cut. It is noted that a slight gap is provided between the bending guide 61b2 and the pressing member 62a so that the bending guide 61b2 and the pressing member 62a do not contact with each other when the rectangular wire 1 is pressed.

When the rectangular wire 1 is bent, an element wire on an outer circumferential surface side of a coil to be formed extends more than on an inner circumferential surface side thereof, and therefore out-of-surface deformation occurs on the outer circumferential surface side. Accordingly, the out-of-surface deformation regulating surface 62a3 provided with a step from the press surface 62a2 forms a predetermined gap between the rectangular wire 1 and the out-of-surface deformation regulating surface 62a3, thereby keeping the out-of-surface deformation within the range of the gap.

Next, a bending step will be described.

In the bending step, the rectangular wire 1 is bent by rotation of the bending tool 61 and the pressing tool 62 of the processing unit 6.

FIG. 10 is a schematic sectional view showing the bending step for the rectangular wire 1.

FIG. 10 shows cross sections of the rectangular wire 1, the fixing unit 5, and the processing unit 6 when the processing device 100 is cut in parallel with the first surface H and the second surface I of the rectangular wire 1 in a range of the length of the short side of the rectangular cross section of the rectangular wire 1. The pressing tool 62 composing the processing unit 6 is also shown together for convenience of description though the pressing tool 62 is not actually cut. As for the bending tool 61 composing the processing unit 6, a cross section of the bending guide 61b2 which protrudes from the flange board surface 61b1 is shown.

FIG. 10(a) is a sectional view showing a state in which the rectangular wire 1 is fixed by the fixing unit 5 and the fourth surface K of the rectangular wire 1 contacts, surface-to-surface, with the bending guide 61b2, before a bending process.

Although not shown, the flange board surface 61b1 of the flange 61b contacts with the first surface H of the rectangular wire 1.

FIG. 10(b) is a sectional view showing a state after the rectangular wire 1 is bent by the bending guide 61b2.

With the rectangular wire 1 pressed by the pressing tool 62, the processing unit 6 rotates leftward.

Since an area pressing the rectangular wire 1 is a small area of only the press surface 62a2, when the processing unit 6 rotates, the rectangular wire 1 moderately slides and extends in the longitudinal direction on the processing unit 6, and is drawn toward the rotational center of the processing unit 6. Since the rectangular wire 1 slides moderately, unevenness of extension in the longitudinal direction is suppressed, so that decrease in the sheet thickness of the rectangular wire 1 after a bending process can be uniformed, and also, damage of an insulating coat in a range from the center of the rectangular wire 1 to the outer circumferential surface side of a coil to be formed can be suppressed. Along with rotation of the processing unit 6, the bending guide 61b2 presses the fourth surface K of the rectangular wire 1, thereby causing plastic deformation, so that the third surface J of the rectangular wire 1 is bent along the cylindrical surface of the shaft 61a.

Since the bending tool 61 and the pressing tool 62 composing the processing unit 6 are rotated integrally, the bending tool 61 and the pressing tool 62 graze in the same direction against the rectangular wire 1. Therefore, no force that causes shearing is applied to the first surface H and the second surface I of the rectangular wire 1, and damage of an insulating coat can be suppressed. Thus, the processing device 100 can form the coil 10 while sequentially performing a bending process for the rectangular wire 1.

Next, a pressing load applied to the rectangular wire 1 during pressing will be described.

In a bending process for the rectangular wire 1, a reactive force against the pressing load from the pressing tool 62, and a load due to expansion in the sheet thickness direction of the rectangular wire 1 are applied to the pressing tool 62 and the bending tool 61. Therefore, the processing unit 6 needs to have a tool configuration with high stiffness.

FIG. 11 is a sectional view showing how a load is transferred by the pressing tool 62.

In a bending process for the rectangular wire 1, a reactive force against the pressing load from the pressing tool 62, and a load due to expansion in the sheet thickness direction of the rectangular wire 1 transfer through the rectangular wire 1, the pressing member 62a, the wedge-shaped member 62b, the press guide 62c, the rotation base 62d, the flange board surface 61b1 of the bending tool 61, and then the rectangular wire 1, whereby a force balance is kept. Thus, since an area for force balance falls within a small range, a force balance loop can be completed within the bending tool 61 and the pressing tool 62. Thus, stiffness of the pressing tool 62 and the bending tool 61 can be increased and a bending process for the rectangular wire 1 can be performed smoothly.

Deformation of the sheet thickness on the inner circumferential surface side of a coil to be formed, caused when the rectangular wire 1 is bent, will be described.

FIG. 12(a) is a sectional view showing the rectangular wire 1 before a bending process in the case where a general bending process is performed for the rectangular wire 1.

The length (sheet thickness) of the short side of the rectangular cross section of the rectangular wire 1 before the bending process is denoted by 1a.

FIG. 12(b) is a sectional view showing the rectangular wire 1 after a bending process in the case where a general bending process is performed for the rectangular wire 1.

The sheet thickness of the rectangular wire 1 on the inner circumferential surface side of a coil to be formed, after the bending process, is denoted by 1b, and the sheet thickness on the outer circumferential surface side after the bending process is denoted by 1c.

Figure 13:
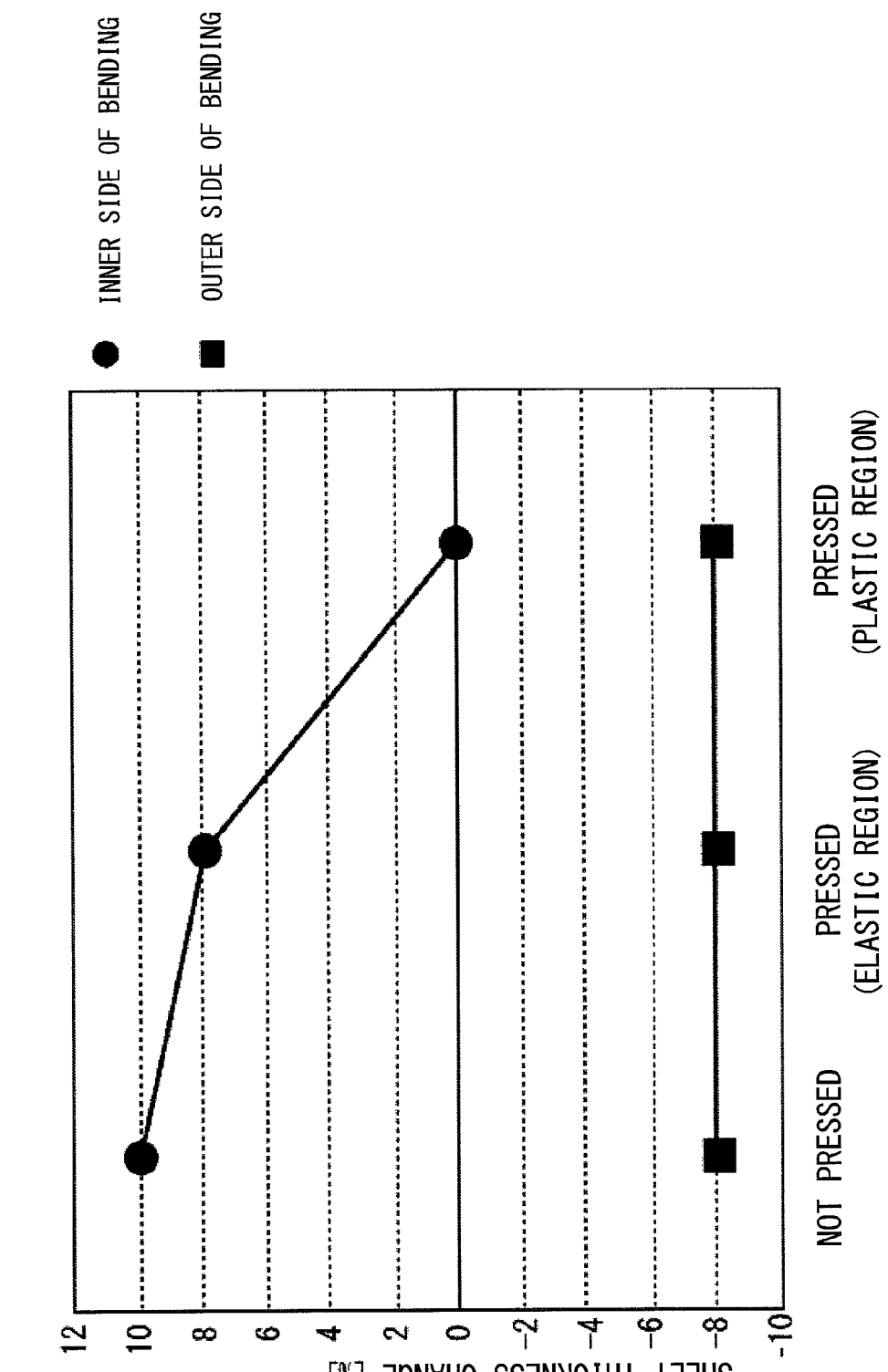
FIG. 13 is a graph showing sheet thickness change in the case of performing a bending process without pressing the rectangular wire and in the case of performing a bending process while pressing the rectangular wire, according to embodiment 1.

FIG. 13 is a graph showing sheet thickness change in the rectangular wire 1 in the case where the rectangular wire 1 is bent without being pressed and in the case where the rectangular wire 1 is bent while being pressed.

As shown in FIG. 13, the sheet thickness 1b of the rectangular wire 1 bent without being pressed increases about 10% as compared to the sheet thickness 1a of an element wire. The sheet thickness 1c of the rectangular wire 1 bent without being pressed decreases about 8% as compared to the sheet thickness 1a of an element wire.

Next, the sheet thickness 1b of the rectangular wire 1 bent while being pressed within an elastic region of the rectangular wire 1 increases about 8% as compared to the sheet thickness 1a of an element wire. The sheet thickness 1c of the rectangular wire 1 bent while being pressed within an elastic region of the rectangular wire 1 decreases about 8% as compared to the sheet thickness 1a of an element wire.

Next, in the case where the rectangular wire 1 is bent while being pressed to be plastically deformed so that the sheet thickness 1a of an element wire decreases about 1%, the sheet thickness 1b of the rectangular wire 1 after the bending process returns to the same thickness as the original sheet thickness 1a of an element wire. In the case where the rectangular wire 1 is bent while being pressed to be plastically deformed so that the sheet thickness 1a of an element wire decreases about 1%, the sheet thickness 1c of the rectangular wire 1 after the bending process decreases about 8% as compared to the sheet thickness 1a of an element wire.

Therefore, if the rectangular wire 1 is bent without being pressed, the sheet thickness on the inner circumferential surface side of a coil to be formed becomes greater than the sheet thickness of an element wire, and the sheet thickness on the outer circumferential surface side of a coil to be formed becomes smaller than the sheet thickness of an element wire. On the other hand, in the case where the rectangular wire 1 is bent while being pressed to be plastically deformed by the processing unit 6 so that the sheet thickness of an element wire decreases about 1%, the sheet thickness of the rectangular wire 1 on the inner circumferential surface side of a coil to be formed becomes equal to the sheet thickness of an element wire.

Thus, in the processing device 100, the rectangular wire 1 is bent while the rectangular wire 1 on the inner circumferential surface side of a coil to be formed is pressed in the sheet thickness direction by the processing unit 6, whereby increase in the sheet thickness of the rectangular wire 1 on the inner circumferential surface side of a coil to be formed is suppressed.

As described above, if the processing device 100 is used, it becomes unnecessary to perform in advance, for an element wire, preprocessing of decreasing the sheet thickness of a part to be bent, and a bending process is performed while the surface formed by the long side of the rectangular cross section of the rectangular wire 1 is pressed, whereby increase in the sheet thickness on the inner circumferential surface side of a coil to be formed, caused by the bending process, can be suppressed, and out-of-surface deformation of the rectangular wire can be regulated.

In addition, since the out-of-surface deformation regulating surface 62a3 of the pressing tool 62 is stepped down from the press surface 62a2 so that an area to press the rectangular wire 1 is a small area of only the press surface 62a2, the rectangular wire 1 moderately slides in the longitudinal direction during the bending process, whereby unevenness of extension in the longitudinal direction can be suppressed and decrease in the sheet thickness of the rectangular wire 1 after the bending process can be uniformed, and also, damage of an insulating coat in a range from the center of the rectangular wire 1 to the outer circumference side of a coil to be formed can be suppressed. Thus, it becomes possible to manufacture the coil 10 while keeping constant the sheet thickness on the inner circumferential side of the coil to be formed, and manufacture the stator 20 in which the space factor of the coil inserted into an iron core is high.

Embodiment 2

Hereinafter, a rectangular wire edgewise-bending processing device according to embodiment 2 of the present invention will be described focusing on a difference from embodiment 1, with reference to the drawings.

Embodiment 1 and the present embodiment are different in the shape of the press surface of the pressing member. The other configuration is the same as in embodiment 1.

FIG. 14(a) is an enlarged view of a part where the rectangular wire 1 is pressed by the processing unit 6.

FIG. 14(b) is an enlarged view of a periphery of the rectangular wire 1 in FIG. 14(a).

A chamfer 262a21 is formed at a fringe of a press surface 262a2 of the pressing member 62a, whereby an edge at the fringe of the press surface 262a2 is moderated.

In the rectangular wire edgewise-bending processing device according to embodiment 2 of the present invention, the chamfer 262a21 is formed at the fringe of the press surface 262a2, whereby a lower surface (second surface I) of the rectangular wire 1 can be pressed while load on an insulating coat of the rectangular wire 1 is reduced.

Embodiment 3

Hereinafter, a rectangular wire edgewise-bending processing device according to embodiment 3 of the present invention will be described focusing on a difference from embodiment 2, with reference to the drawings.

Embodiment 2 and the present embodiment are different in the press surface of the pressing member. The other configuration is the same as in embodiment 2.

FIG. 15(a) is an enlarged view of a part where the rectangular wire 1 is pressed by the processing unit 6.

FIG. 15(b) is an enlarged view of a periphery of the rectangular wire 1 in FIG. 15(a).

A rounded part 362a21 is formed at a fringe of a press surface 362a2 of the pressing member 62a, whereby the fringe of the press surface 362a2 is rounded.

In the rectangular wire edgewise-bending processing device according to embodiment 3 of the present invention, since the rounded part 362a21 is formed at the fringe of the press surface 362a2, a lower surface (second surface I) of the rectangular wire 1 can be pressed while load on an insulating coat of the rectangular wire 1 is reduced.

It is noted that, within the scope of the present invention, the above embodiments may be freely combined with each other, or each of the above embodiments may be modified or abbreviated as appropriate.

The invention claimed is:

1. A rectangular wire edgewise-bending processing device for performing an edgewise-bending process for a rectangular wire to form a coil, wherein one surface formed by a long side of a rectangular cross section of the rectangular wire is a first surface, a surface opposite to the first surface is a second surface, a surface, formed by a short side of the rectangular cross section of the rectangular wire, which corresponds to an inner circumferential surface side of the coil to be formed, is a third surface, and a surface opposite to the third surface, which corresponds to an outer circumferential surface side of the coil to be formed, is a fourth surface, the rectangular wire edgewise-bending processing device comprising:
   a fixing member for fixing a straight portion of the rectangular wire;
   a bending tool including:
      a shaft being rotatable and cylindrical and having a rotational axis extending in a short-side direction of the rectangular cross section of the rectangular wire, the shaft allowing the third surface to contact with an outer circumferential surface of the shaft in such a positional relationship that the rotational axis of the shaft is perpendicular to a longitudinal direction of the rectangular wire; and
      a flange attached to the shaft, the flange having a flange board surface for pressing the first surface,
      and having a bending guide protruding from the flange board surface in the same direction as the shaft, so as to contact with the fourth surface; and
   a pressing tool for pressing the second surface toward the flange, with the rectangular wire held between the pressing tool and the flange board surface of the flange, wherein the pressing tool includes:
   a pressing member having a press surface for pressing the rectangular wire;
   a rotation base fixing an end portion, of the bending tool, at a side where the flange does not exist, the rotation base rotating integrally with the bending tool;
   a press guide placed on the rotation base; and
   a wedge-shaped member movable frontward and backward perpendicularly to the shaft while being guided by the press guide, between the pressing member and the press guide, thereby causing the pressing member to move upward and downward along a slope of the wedge-shaped member.

2. The rectangular wire edgewise-bending processing device according to claim 1, wherein the pressing tool has:
   the press surface for pressing a part, of the rectangular wire, on the inner circumferential surface side of the coil to be formed; and
   an out-of-surface deformation regulating surface stepped down from the press surface, for regulating out-of-surface deformation of the rectangular wire via a gap between the out-of-surface deformation regulating surface and the rectangular wire.

3. The rectangular wire edgewise-bending processing device according to claim 1, wherein the bending guide contacts, surface-to-surface, with the fourth surface.

4. The rectangular wire edgewise-bending processing device according to claim 1, wherein a positional relationship between the pressing tool and the bending tool does not relatively change during a bending process.

5. The rectangular wire edgewise-bending processing device according to claim 1, wherein a fringe of the press surface is chamfered.

6. The rectangular wire edgewise-bending processing device according to claim 1, wherein a fringe of the press surface is rounded.

7. A rectangular wire edgewise-bending processing method for performing an edgewise-bending process for a rectangular wire, wherein one surface formed by a long side of a rectangular cross section of the rectangular wire is a first surface, a surface opposite to the first surface is a second surface, a surface, formed by a short side of the rectangular cross section of the rectangular wire, which corresponds to an inner circumferential surface side of a coil to be formed, is a third surface, and a surface opposite to the third surface, which corresponds to an outer circumferential surface side of the coil to be formed, is a fourth surface, wherein
   the third surface contacts with an outer circumferential surface of a shaft that is rotatable and cylindrical and has a rotational axis extending in a short-side direction of the rectangular cross section of the rectangular wire, the rectangular wire edgewise-bending processing method comprising:
   a pressing step of plastically deforming the rectangular wire to decrease a sheet thickness which is a length of the short side of the rectangular cross section; and
   a bending step of bending the rectangular wire so that the third surface is bent along the outer circumferential surface of the shaft, while the rectangular wire is pressed in the pressing step, wherein, in the pressing step, a bending guide presses the fourth surface along with rotation of a bending tool which includes a flange attached to the shaft, the flange having a flange board surface for pressing the first surface, and having the bending guide protruding from the flange board surface in the same direction as the shaft, so as to contact with the fourth surface.

8. The rectangular wire edgewise-bending processing method according to claim 7, wherein, in the pressing step, a part, of the rectangular wire, on the inner circumferential surface side of the coil to be formed, is pressed.

9. The rectangular wire edgewise-bending processing method according to claim 7, wherein, in the pressing step, the rectangular wire is plastically deformed so that the sheet thickness is decreased 1%.

* * * * *